United States Patent
Gauthier

(10) Patent No.: US 9,672,100 B2
(45) Date of Patent: Jun. 6, 2017

(54) DEVICE FOR MANAGING THE STORAGE OF DATA

(71) Applicant: AIRBUS OPERATIONS SAS, Toulouse (FR)

(72) Inventor: Stéphane Gauthier, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 22 days.

(21) Appl. No.: 14/876,209

(22) Filed: Oct. 6, 2015

(65) Prior Publication Data
US 2016/0098315 A1   Apr. 7, 2016

(30) Foreign Application Priority Data
Oct. 7, 2014   (FR) ...................................... 14 59597

(51) Int. Cl.
*G06F 11/00* (2006.01)
*G06F 11/10* (2006.01)

(52) U.S. Cl.
CPC ...... *G06F 11/1004* (2013.01); *G06F 11/1044* (2013.01); *G06F 11/1076* (2013.01)

(58) Field of Classification Search
CPC ............ G06F 11/1004; G06F 11/1044; G06F 11/1076; G06F 11/1612; G06F 11/108
See application file for complete search history.

(56) References Cited

U.S. PATENT DOCUMENTS

| 6,584,543 | B2 * | 6/2003 | Williams | G06F 11/1052 711/105 |
| 8,006,126 | B2 * | 8/2011 | Deenadhayalan | G06F 11/1076 714/6.1 |
| 8,719,665 | B2 * | 5/2014 | Roohparvar | G06F 11/1072 365/185.09 |
| 8,949,684 | B1 * | 2/2015 | Shalvi | G11C 5/005 714/763 |
| 2008/0189481 | A1 | 8/2008 | Mayer | |

(Continued)

FOREIGN PATENT DOCUMENTS

| FR | 3 001 818 | 8/2014 |
| WO | 2008/154134 | 12/2008 |

OTHER PUBLICATIONS

Preliminary French Search Report and Written Opinion dated Jun. 24, 2015.

(Continued)

*Primary Examiner* — Marc Duncan
(74) *Attorney, Agent, or Firm* — Dickinson Wright

(57) ABSTRACT

A device manages the storage of data in at least one storage device of a first type and in a storage device of a second type, the at least one storage device of the first type being physically distinct from the storage device of the second type. The device partitions data to be stored into blocks of data, determines redundancies generated by an error detection code for each block of data, stores blocks of data in the at least one storage device of the first type, the storage device(s) of the first type being compliant with an avionic quality assurance level of a given quality level, and stores redundancies in the storage device of the second type, the storage device of the second type being compliant with an avionic quality assurance level that is higher than the avionic quality assurance level of the storage device(s) of first type.

7 Claims, 3 Drawing Sheets

(56) References Cited

U.S. PATENT DOCUMENTS

| | | | |
|---|---|---|---|
| 2010/0088579 A1* | 4/2010 | Hafner | G06F 11/1076 |
| | | | 714/807 |
| 2010/0250057 A1* | 9/2010 | Steffler | G06F 11/1666 |
| | | | 701/33.4 |
| 2013/0024727 A1 | 1/2013 | Frayssignes | |
| 2014/0068208 A1* | 3/2014 | Feldman | G06F 11/1076 |
| | | | 711/162 |
| 2014/0223243 A1 | 8/2014 | Robin | |
| 2015/0301893 A1* | 10/2015 | Syrgabekov | H04L 1/0041 |
| | | | 714/6.24 |
| 2017/0068596 A1* | 3/2017 | Kaplan | G06F 11/2023 |

OTHER PUBLICATIONS

EUROCAE ED-79A/SAE ARP 4754A, "Guidelines for Development of Civil Aircraft and Systems," The European Organisation for Civil Aviation Equipment, Dec. 2010, 129 pages total, p. 1, Line 28.

* cited by examiner

DEVICE FOR MANAGING THE STORAGE OF DATA

CROSS REFERENCE TO RELATED APPLICATION

This application is entitled to and claims the benefit of French Application No. 14/59597 filed Oct. 7, 2014, the disclosure of which, including the specification, claims, drawings and abstract, are incorporated herein by reference in their entirety.

FIELD

The present invention concerns a device and a method for storing data in at least one storage device of a first type and in a storage device of a second type.

BACKGROUND

The storage of data and the retrieval of the data in/from electronic memories are sometimes subject to errors linked to writing, reading and sometimes to the electronic memories themselves.

These errors, which bring about losses from the stored data, can have not insignificant consequences. Moreover, it is important to be able to detect the fault in the storage means as rapidly as possible when said storage means degrades, so as to take suitable measures.

This is particularly the case when the data are data associated with the operation of an aircraft and the quantity of which increases continually.

The French patent application published under the number FR3001818 discloses a device for duplicating data on different storage devices.

In aeronautics, standards are provided that qualify the quality assurance level of equipment.

The quality assurance level or DAL, for "Design Assurance Level", of a piece of avionic equipment defines the demands relating to the level thereof.

The levels of DAL are defined in the Eurocae document ED-79/SAE ARP 4754A, for example. This document defines five quality levels from DAL-A to DAL-E in decreasing order of quality assurance. The level DAL-A corresponds to the highest quality level and the level DAL-E corresponds to the lowest quality level. DAL-A level equipment is used for avionic functions that are critical for the aircraft, whereas DAL-E level equipment is used for functions that have no impact on the safety of the aircraft.

The high quality levels often make it impossible to use high-capacity modern storage means. These storage means quite often have onboard controllers and software that are difficult to access and difficult to qualify in terms of quality.

SUMMARY

The aim of the present invention is to resolve the disadvantages of the prior art by proposing a device and a method that make it possible to guarantee a high quality level in the operation of storage devices even if said storage devices have a lower quality level than the required quality level.

To this end, according to a first aspect, the invention proposes a device for storing data in at least one storage device of a first type and in a storage device of a second type, the at least one storage device of the first type being physically distinct from the storage device of the second type, characterized in that the device has:

means for partitioning the data to be stored into blocks of data,
means for determining redundancies generated by an error detection code for each block of data,
means for storing the blocks of data in the at least one storage device of the first type, the storage device or devices of the first type being compliant with an avionic quality assurance level of a given quality level,
means for storing redundancies in the storage device of the second type, the storage device of the second type being compliant with an avionic quality assurance level that is higher than the avionic quality assurance level of the storage device or devices of first type.

The present invention also concerns a method for storing data in at least one storage device of a first type and in a storage device of a second type, the at least one storage device of the first type being physically distinct from the storage device of the second type, characterized in that the method has the steps of:

partitioning the data to be stored into blocks of data,
determining redundancies generated by an error detection code for each block of data,
storing the blocks of data in the at least one storage device of the first type, the storage device or devices of the first type being compliant with an avionic quality assurance level of a given quality level,
storing the redundancies in the storage device of the second type, the storage device of the second type being compliant with an avionic quality assurance level that is higher than the avionic quality assurance level of the storage device or devices of first type.

The present invention also concerns a device for managing the storage of data in at least one storage device of a first type and in a storage device of a second type, the at least one storage device of the first type being physically distinct from the storage device of the second type, in which the device has:

a processor configured to partition data to be stored into blocks of data,
a processor configured to determine redundancies generated by an error detection code for each block of data,
a processor configured to store blocks of data in the at least one storage device of the first type, the storage device or devices of the first type being compliant with an avionic quality assurance level of a given quality level,
a processor configured to store redundancies in the storage device of the second type, the storage device of the second type being compliant with an avionic quality assurance level that is higher than the avionic quality assurance level of the storage device or devices of first type.

Thus, it is possible to guarantee a high quality level in the control of correct operation of storage devices of the first type even if said storage devices are of a lower quality level than the required level.

By using a storage device of the second type that is compliant with a high avionic quality assurance level to store the redundancies, the overall quality level for the control of correct operation of storage devices of the first type itself is improved.

According to a particular mode of the invention, the device for managing the storage of data moreover has:

means for reading, such as a processor that is set up to read, a block of data from the at least one storage device of the first type, means for reading, such as a processor that is set up to read, from the storage device of the second type of the redundancy corresponding to the block of read data, means for checking, such as a processor that is set up to check, the compatibility of the read redundancies with the data of the block of read data, means for validating, such as a processor that is set up to validate, the data of the read block of data if the read redundancies and the data of the block of data are compatible.

According to a particular mode of the invention, the device for managing the storage of data moreover has means for storing, such as a processor that is set up to store, in the storage device of the second type, a piece of information identifying the error detection code among a plurality of error correction codes.

According to a particular mode of the invention, the device for managing the storage of data moreover has means for reading, such as a processor that is configured to read, from the storage device of the second type the information identifying the error detection code among a plurality of error detection codes.

According to a particular mode of the invention, the error detection code is capable of correcting at least one error and the device for managing the storage of data moreover has:

means for correcting, such as a processor that is set up to correct data of the read block of data if the read redundancies and the data of the block of data are not compatible, means for determining, such as a processor that is set up to determine that the data of the read block of data are erroneous if the data of the read block of data cannot be corrected by the redundancies.

According to a particular mode of the invention, the device for managing the storage of data moreover has means for reading, such as a processor that is set up to read, from the storage device of the second type, the information identifying the correction code among a plurality of error correction codes.

According to a particular mode of the invention, the storage device of the second type has a lower storage capacity than the storage capacity of the at least one storage device of the first type.

The present invention also concerns an aircraft that has the device for managing the storage of data on at least one storage device of a first type and a storage device of a second type according to the present invention.

The invention also concerns computer programs stored on an information storage medium, said programs having instructions allowing implementation of the methods described above when they are loaded and executed by a computer device.

BRIEF DESCRIPTION OF DRAWINGS

The features of the invention that have been mentioned above, and others, will emerge more clearly upon reading the following description of an exemplary embodiment, said description being provided with reference to the appended drawings, among which.

DETAILED DESCRIPTION OF EMBODIMENTS

Figure 1:
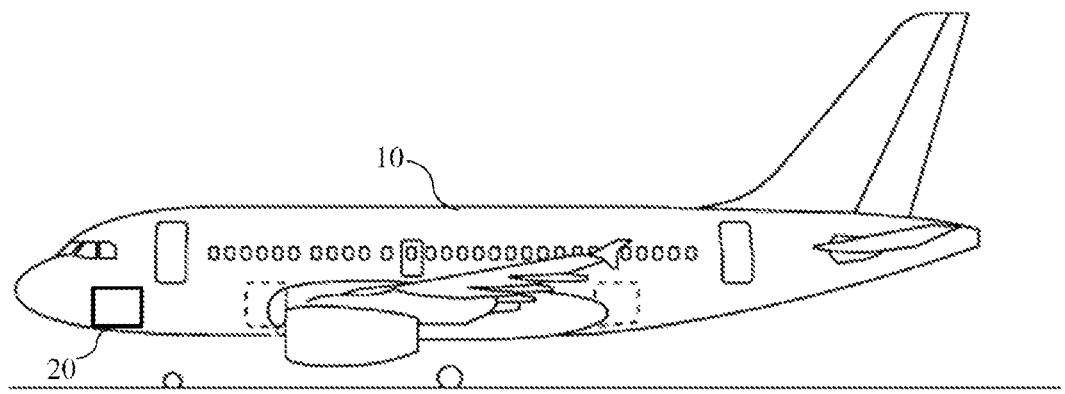
FIG. 1 shows an aircraft having a device for managing the storage of data according to an embodiment of the invention.

FIG. 1 shows an aircraft having a device for managing the storage of data according to an embodiment of the invention.

The device for managing the storage of data 20 is placed in the aircraft 10, for example in the cockpit of the aircraft or in a secure area that cannot be accessed by the passengers of the aircraft.

Figure 2:
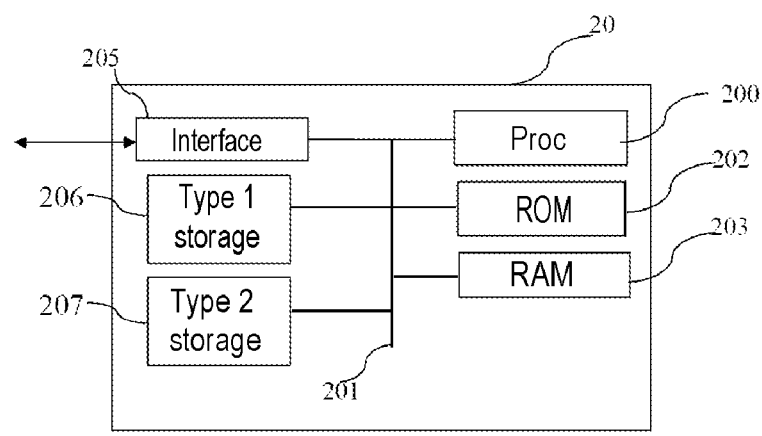
FIG. 2 shows an example of an architecture for a device for managing the storage of data according to an embodiment of the invention.

FIG. 2 shows an example of an architecture for a data storage device according to an embodiment of the invention.

The device for managing the storage of data 20 comprises:

a processor, microprocessor or microcontroller 200;

a volatile memory 203;

a nonvolatile memory 202;

an interface 205 with a communication network, such as a local area network by means of which the data to be stored or read are transferred to a remote device, for example;

at least one storage device of a first type 206 that is compliant with an avionic quality assurance level of a quality level DAL-D or DAL-E as defined in the Eurocae document ED-79/SAE ARP 4754A;

a storage device of a second type 207 that is compliant with an avionic quality assurance level of a quality level DAL-A or DAL-B or DAL-C as defined in the Eurocae document ED-79/SAE ARP 4754A;

a communication bus 201 connecting the processor 200 to the ROM memory 202, to the RAM memory 203, to the interface 205, to the at least one storage device of the first type 206 and to the at least one storage device of the second type 207.

The processor 200 is capable of executing instructions that are loaded into the volatile memory 203 from the nonvolatile memory 202, from an external memory (not shown) or from a communication network. When the device for managing the storage of data 20 is powered up, the processor 200 is capable of reading instructions from the volatile memory 203 and of executing them. These instructions form a computer program that prompts the implementation, by the processor 200, of all or some of the method described with reference to FIG. 3 or 4.

All or some of the method described with reference to FIG. 3 or 4 can be implemented in software form by the execution of a set of instructions by a programmable machine, such as a DSP (Digital Signal Processor) or a microcontroller or be implemented in hardware form by a machine or a dedicated component, such as an FPGA (Field-Programmable Gate Array) or an ASIC (Application-Specific Integrated Circuit).

The storage device or devices of the first type 206 has or have a higher storage capacity than that of the storage device of the second type 207.

A storage device of the first type 206 is, by way of example, a memory of SSD, the acronym for "Solid State Drive", or SD, the acronym for Secure Digital, or eMMC, the acronym for "MultiMedia Card", type or a set of memories associated with a redundancy generating device, for example of RAID, the acronym for "Redundant Arrays of Inexpensive Disks", type.

A storage device of the second type 207 is, by way of example, a memory of nvRAm or MRAM, the acronym for "Magnetic Random Access Memory", or EEPROM, the acronym for "Electrically Erasable Programmable Read-Only Memory", or FLASH type.

Figure 3:
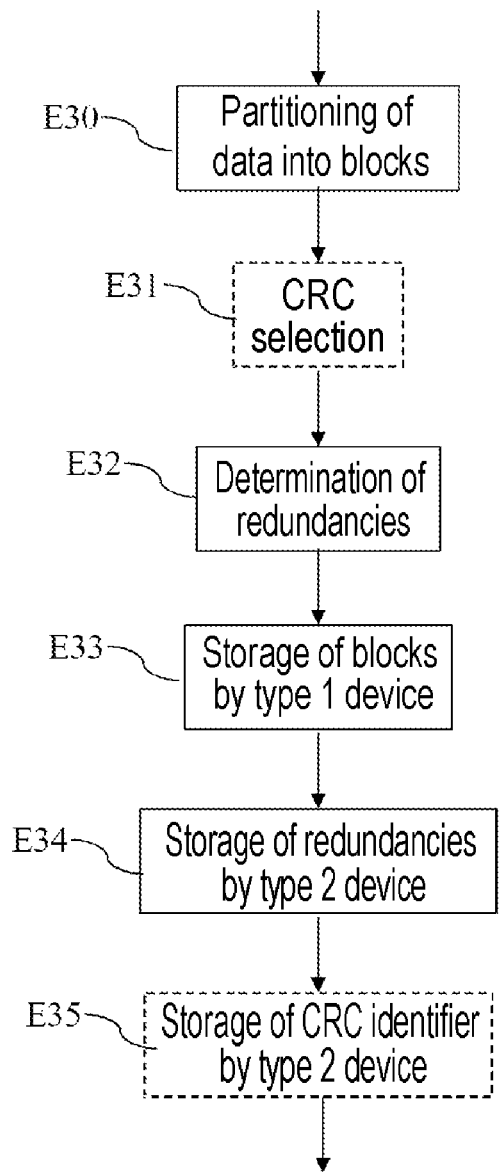
FIG. 3 shows an algorithm for managing the storage of data in at least one storage device of a first type and in a storage device of a second type.

FIG. 3 shows an algorithm for managing the storage of data in at least one storage device of a first type and in a storage device of a second type.

More precisely, the present algorithm is executed by the processor 200 of the device for managing the storage of data 20 each time data need to be stored.

In step E30, the processor 200 receives data to be stored from the interface 205 and partitions the data into blocks of data. The size of the blocks is a compromise between the size that is necessary for storing the redundancies that will be generated by the error detection code and the avionic quality assurance level of the storage device of the first type 206. The error detection code is an error correction code in one particular embodiment.

The greater the size of the blocks of data, the smaller the size necessary for storing the redundancies that are generated by the error detection code in the storage device of the second type 207. The greater the size of the blocks of data, the higher the risk of impossibility of correction, when the error detection code is capable of correcting at least one error, of at least one error in the data of a block. This is because an error correction code allows the correction of a predetermined number of errors in a block of data. Moreover, the greater the size of the blocks of data, the more complex the reading and writing of small-sized data.

By way of example and in a non limiting manner, a block of data has a size of eight kilobytes.

According to one particular embodiment, the processor 200 selects an error detection code from a plurality of error detection codes in the next step E31. By way of example, the error detection code is chosen according to the avionic quality assurance level of the storage device of the first type 206.

By way of example, the error detection code is a Hamming code. A Hamming code is a linear detection and correction code. It allows the detection and the automatic correction of an error if said error relates only to one bit of the block of data. The Hamming code, for a given code length, is the most compact code for a given correction capacity. In this regard, its yield is at a maximum.

In the next step E32, the processor 200 determines the redundancies generated by the error detection code.

In the next step E33, the processor 200 controls the storage of each block of data in the at least one storage device of the first type 206.

In the next step E34, the processor 200 controls the storage of the redundancies in the storage device of the second type 207.

It should be noted at this juncture that the processor 200 uses the storage device of the second type 207 to store a table associating each redundancy with the block of data with which the redundancy has been determined.

According to the particular embodiment, the processor 200 controls the storage, in the memory of second type, an information identifying the error detection code chosen in step E31.

Figure 4:
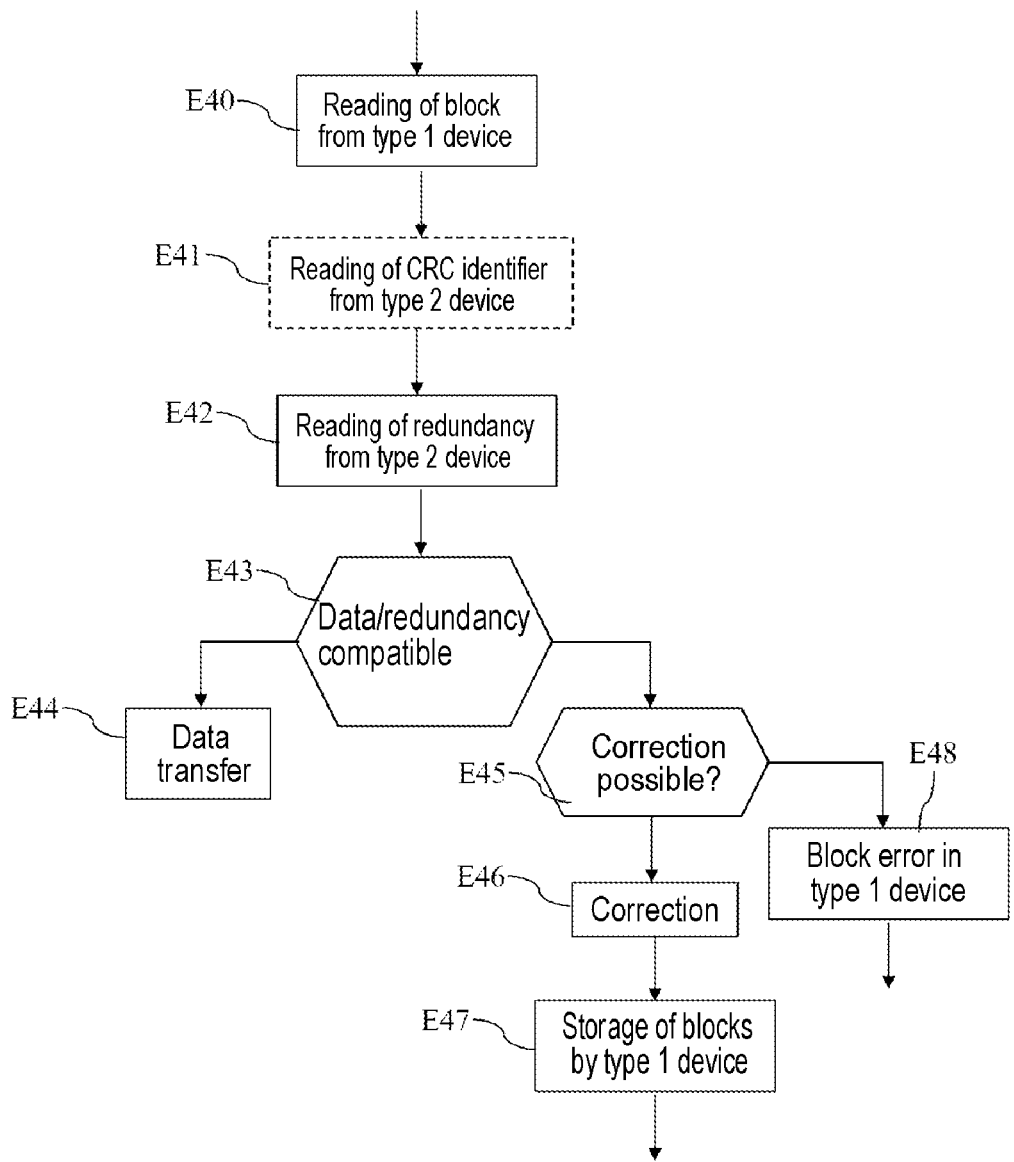
FIG. 4 shows an algorithm for reading data from at least one storage device of a first type and from a storage device of a second type.

FIG. 4 shows an algorithm for reading data from at least one storage device of a first type and from a storage device of a second type.

More precisely, the present algorithm is executed by the processor 200 of the device for managing the storage of data 20 each time data need to be read and for each block comprising the data that need to be read.

In step E40, the processor 200 reads a block of data in the at least one storage device of the first type 206.

According to one particular embodiment, the processor 200 moves to the next step E41 and reads from the storage device of the second type 207 a piece of information identifying the error detection code selected in step E31 of FIG. 3.

In the next step E42, the processor 200 reads from the storage device of the second type 207 the redundancies determined from the data contained in the block of data read in step E40.

In the next step E43, the processor 200 checks the compatibility between the redundancies read in step E42 and the data contained in the block of data read in step E40.

If the redundancies read in step E42 and the data contained in the block of data read in step E40 are compatible, the processor 200 moves to step E44 and controls the transfer of the data by means of the network interface 205 or the storage of the data in the random access memory 203.

If the redundancies read in step E42 and the data contained in the block read in step E40 are not compatible and the detection code is an error correction code, the processor 200 moves to step E45. If the detection code is not capable of correcting at least one error, the processor 200 moves to step E48.

In step E45, the processor 200 checks whether the redundancy allows possible correction of the data that have been read.

If so, the processor 200 moves to step E46. If not, the processor 200 moves to step E48.

In step E46, the processor 200 corrects the error contained in the data that have been read using redundancies.

In the next step E47, the processor 200 controls the storage of the corrected block of data in the storage device of the second type 206 and controls the transfer of the corrected data by means of the network interface 205 or the storage of the data in the random access memory 203.

In step E48, the processor 200 controls the transfer of a message to the application that has requested reading of the block of data, indicating thereto that the latter is corrupt. The application can provide notification of the need to perform a maintenance operation or can control a new storage operation for the data.

Naturally, the present invention is in no way limited to the embodiments described here but on the contrary includes any variant within reach of a person skilled in the art.

The invention claimed is:

1. A device for managing the storage of data in at least one storage device of a first type and in a storage device of a second type, the at least one storage device of the first type being physically distinct from the storage device of the second type, in which the device has a processor configured to:
   partition data to be stored into blocks of data,
   select an error correction code from among a plurality of error correction codes,
   determine redundancies generated by the selected error detection code for each block of data,
   store blocks of data in the at least one storage device of the first type, the storage device or devices of the first type being compliant with an avionic quality assurance level of a given quality level, and
   store redundancies in the storage device of the second type, the storage device of the second type being compliant with an avionic quality assurance level that is higher than the avionic quality assurance level of the storage device or devices of first type, wherein:

the processor is configured to store in the storage device of the second type an information identifying the selected error detection code among the plurality of error detection codes and to read from the storage device of the second type the information identifying the selected error detection code among the plurality of error detection codes.

2. The device for managing the storage of data according to claim 1, in which the processor is configured to:

read a block of data from the at least one storage device of the first type, read, from the storage device of the second type, the redundancy corresponding to the block of read data, check the compatibility of the read redundancies with the data of the block of read data, validate the data of the read block of data if the read redundancies and the data of the block of data are compatible.

3. The device for managing the storage of data according to claim 1, in which the selected error detection code is capable of correcting at least one error and the processor is configured to:

correct data of the read block of data if the read redundancies and the data of the block of data are not compatible, determine that the data of the read block of data are erroneous if the data of the read block of data cannot be corrected by the redundancies.

4. The device for managing the storage of data according to claim 1, in which the storage device of the second type has a lower storage capacity than the storage capacity of the at least one storage device of the first type.

5. The device for managing the storage of data according to claim 1, in which the selected error detection code is a Hamming code.

6. Aircraft having a device for managing the storage of data according to claim 1.

7. A method for managing the storage of data in at least one storage device of a first type and in a storage device of a second type, the at least one storage device of the first type being physically distinct from the storage device of the second type, wherein the method has the steps of:

partitioning the data to be stored into blocks of data, selecting an error correction code from among a plurality of error correction codes, determining redundancies generated by the selected error detection code for each block of data, storing the blocks of data in the at least one storage device of the first type, the storage device or devices of the first type being compliant with an avionic quality assurance level of a given quality level, storing the redundancies in the storage device of the second type, the storage device of the second type being compliant with an avionic quality assurance level that is higher than the avionic quality assurance level of the storage device or devices of first type, storing in the storage device of the second type an information identifying the selected error detection code among the plurality of error detection codes, and reading from the storage device of the second type the information identifying the selected error detection code among the plurality of error detection codes.

* * * * *